(12) United States Patent
Ota et al.

(10) Patent No.: US 12,522,441 B2
(45) Date of Patent: Jan. 13, 2026

(54) MANAGEMENT APPARATUS, MANAGEMENT METHOD, AND PROGRAM

(71) Applicant: TOYOTA JIDOSHA KABUSHIKI KAISHA, Toyota (JP)

(72) Inventors: Junya Ota, Tokyo-to (JP); Takatoshi Morimitsu, Toyota (JP); Uori Koike, Saitama (JP); Kunihiro Iwamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 462 days.

(21) Appl. No.: 18/325,339

(22) Filed: May 30, 2023

(65) Prior Publication Data
US 2023/0406640 A1    Dec. 21, 2023

(30) Foreign Application Priority Data
Jun. 20, 2022  (JP) ................. 2022-098764

(51) Int. Cl.
B65G 1/137     (2006.01)
B25J 9/16      (2006.01)
G06Q 10/0631   (2023.01)
G06Q 10/08     (2024.01)
G06Q 10/087    (2023.01)

(52) U.S. Cl.
CPC ..... *B65G 1/1378* (2013.01); *G06Q 10/06313* (2013.01); *G06Q 10/06315* (2013.01); *G06Q 10/08* (2013.01); *G06Q 10/087* (2013.01); *B25J 9/16* (2013.01); *B65G 1/137* (2013.01)

(58) Field of Classification Search
CPC ............ B65G 1/1378; B65G 1/137; G06Q 10/06313; G06Q 10/06315; G06Q 10/08; G06Q 10/087; B25J 9/16; B25J 9/1679; B25J 9/1682
See application file for complete search history.

(56) References Cited

U.S. PATENT DOCUMENTS

| | | | |
|---|---|---|---|
| 5,802,414 A * | 9/1998 | Nakashima ............ | G03D 3/065 396/626 |
| 2022/0080237 A1* | 3/2022 | Predonu ............... | B64U 30/293 |
| 2022/0108267 A1 | 4/2022 | Yamamoto et al. | |

FOREIGN PATENT DOCUMENTS

| JP | 2015-042587 A | 3/2015 |
|---|---|---|
| JP | 2021-011341 A | 2/2021 |
| JP | 2021-157516 A | 10/2021 |

(Continued)

*Primary Examiner* — Thomas Randazzo
*Assistant Examiner* — Laurence R Brothers
(74) *Attorney, Agent, or Firm* — Sughrue Mion, PLLC

(57) ABSTRACT

A management apparatus, a management method, and a program capable of preventing inefficient replenishment from being performed are provided. A management apparatus includes an information acquisition unit configured to acquire consumption information, which is information indicating an amount of consumption of articles stored in a storage container and a replenishment determination unit configured to determine, based on the consumption information, whether to individually replenish articles in the storage container in which the articles have been consumed using a picking robot or to replace the storage container in which the articles have been consumed by a storage container in which a predetermined number of articles are stored.

9 Claims, 17 Drawing Sheets

(56) References Cited

FOREIGN PATENT DOCUMENTS

| JP | 2022-060102 A | 4/2022 |
|---|---|---|
| WO | 2017/168678 A1 | 10/2017 |

\* cited by examiner

|  | REMAINING RATIO |
|---|---|
| ARTICLE A | 20% |
| ARTICLE B | 100% |
| ARTICLE C | 100% |
| ARTICLE D | 10% |

Fig. 11

|  | $C_1$ (WEIGHT) | $C_2$ (MATERIAL) | $C_3$ (SHAPE) | TOTAL (WORKING COST PER ARTICLE) |
|---|---|---|---|---|
| ARTICLE A | 10 | 1 | 4 | 15 |
| ARTICLE B | 2 | 3 | 2 | 7 |
| ARTICLE C | 1 | 0 | 1 | 2 |
| ARTICLE D | 1 | 2 | 2 | 5 |

Fig. 14

|  | WORKING COST PER ARTICLE | NUMBER OF ARTICLES TO BE REPLENISHED | WORKING COST REQUIRED FOR REPLENISHMENT | TOTAL WORKING COST |
|---|---|---|---|---|
| ARTICLE A | 15 | 0 | 0 | 4 |
| ARTICLE B | 7 | 0 | 0 | |
| ARTICLE C | 2 | 2 | 4 | |
| ARTICLE D | 5 | 0 | 0 | |

Fig. 15

|  | WORKING COST PER ARTICLE | NUMBER OF ARTICLES TO BE REPLENISHED | WORKING COST REQUIRED FOR REPLENISHMENT | TOTAL WORKING COST |
|---|---|---|---|---|
| ARTICLE A | 15 | 1 | 15 | 29 |
| ARTICLE B | 7 | 2 | 14 | |
| ARTICLE C | 2 | 0 | 0 | |
| ARTICLE D | 5 | 0 | 0 | |

Fig. 16

MANAGEMENT APPARATUS, MANAGEMENT METHOD, AND PROGRAM

CROSS REFERENCE TO RELATED APPLICATIONS

This application is based upon and claims the benefit of priority from Japanese patent application No. 2022-098764, filed on Jun. 20, 2022, the disclosure of which is incorporated herein in its entirety by reference.

BACKGROUND

The present disclosure relates to a management apparatus, a management method, and a program.

In recent years, technologies for automation of logistics have been advancing. For example, International Patent Publication No. WO2017/168678 discloses a technique for achieving efficient shipping and replenishment operations by a robot carrying goods to a predetermined storage place in a warehouse.

SUMMARY

As a technique for replenishing articles using a robot when articles stored in a storage container have been consumed, the present inventors have discussed a technique in which a robot picks up articles that should be replenished one by one and puts these articles in the storage container. However, efficient replenishment may not be achieved by using the replenishment method alone in which articles are replenished one by one by the robot. It has therefore been required to provide a technique for efficiently replenishing articles.

The present disclose has been made in view of the aforementioned circumstances and an object of the present disclosure is to provide a management apparatus, a management method, and a program capable of preventing inefficient replenishment from being performed.

An aspect of the present disclosure to accomplish the aforementioned object is a management apparatus including: an information acquisition unit configured to acquire consumption information, which is information indicating an amount of consumption of articles stored in a storage container; and a replenishment determination unit configured to determine, based on the consumption information, whether to individually replenish articles in the storage container in which the articles have been consumed using a picking robot or to replace the storage container in which the articles have been consumed by a storage container in which a predetermined number of articles are stored.

According to the aforementioned management apparatus, the replenishment method is flexibly switched depending on the state of the consumption of articles. It is therefore possible to prevent inefficient replenishment from being performed.

In the above aspect, the replenishment determination unit may determine, based on the magnitude of the amount of consumption specified from the consumption information, whether to individually replenish the articles in the storage container in which the articles have been consumed using the picking robot or to replace the storage container in which the articles have been consumed by a storage container in which a predetermined number of articles are stored.

According to the aforementioned configuration, it is possible to prevent a storage container in which a large number of articles remain from being replaced. It is therefore possible to prevent inefficient replenishment from being performed.

In the above aspect, the replenishment determination unit may determine, based on the magnitude of the variation of the amount of consumption for each kind of article specified from the consumption information, whether to individually replenish the articles in the storage container in which the articles have been consumed using the picking robot or to replace the storage container in which the articles have been consumed by a storage container in which a predetermined number of articles are stored.

According to the aforementioned configuration, it is possible to prevent a storage container in which a number of articles of a limited kind remain from being replaced by another storage container. It is therefore possible to prevent inefficient replenishment from being performed.

In the above aspect, the replenishment determination unit may make the determination based on a cost of the work performed by the picking robot calculated from features of the articles and the consumption information for replenishment by the picking robot.

According to the aforementioned configuration, the replenishment method is switched in accordance with the cost of the work performed by the picking robot. Accordingly, it is possible to prevent inefficient replenishment from being performed in view of the cost of the work performed by the picking robot.

In the above aspect, the replenishment determination unit may make the determination based on the working cost which depends on at least a weight of the article.

Accordingly, it is possible to determine the replenishment method in view of the cost of the work performed by the picking robot depending on the weight of the article.

In the above aspect, the replenishment determination unit may make the determination based on the working cost which depends on at least a material of the article.

Accordingly, it is possible to determine the replenishment method in view of the cost of the work performed by the picking robot depending on the material of the article.

In the above aspect, the replenishment determination unit may make the determination based on the working cost which depends on at least a shape of the article.

Accordingly, it is possible to determine the replenishment method in view of the cost of the work performed by the picking robot depending on the shape of the article.

Another aspect of the present disclosure in order to accomplish the aforementioned object is a management method in which a management apparatus acquires consumption information, which is information indicating an amount of consumption of articles stored in a storage container, and, determines, based on the consumption information, whether to individually replenish articles in the storage container in which the articles have been consumed using a picking robot or to replace the storage container in which the articles have been consumed by a storage container in which a predetermined number of articles are stored.

According to the aforementioned management method, the replenishment method is flexibly switched depending on the state of the consumption of articles. It is therefore possible to prevent inefficient replenishment from being performed.

Another aspect of the present disclosure in order to accomplish the aforementioned object is a program for causing a computer to execute the following processing of: acquiring consumption information, which is information indicating an amount of consumption of articles stored in a storage container; and determining, based on the consumption information, whether to individually replenish articles in the storage container in which the articles have been consumed using a picking robot or to replace the storage container in which the articles have been consumed by a storage container in which a predetermined number of articles are stored.

According to the aforementioned program, the replenishment method is flexibly switched depending on the state of the consumption of articles. It is therefore possible to prevent inefficient replenishment from being performed.

According to the present disclosure, it is possible to provide a management apparatus, a management method, and a program capable of preventing inefficient replenishment from being performed.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 11 is a table for explaining calculation of the magnitude of a variation;

FIG. 14 is a table showing a specific example of determination of a working cost for picking up one article;

FIG. 15 is a table showing a specific example of calculation of the working cost;

FIG. 16 is a table showing a specific example of calculation of the working cost.

DESCRIPTION OF EMBODIMENTS

Overview of Embodiments

Figure 1:
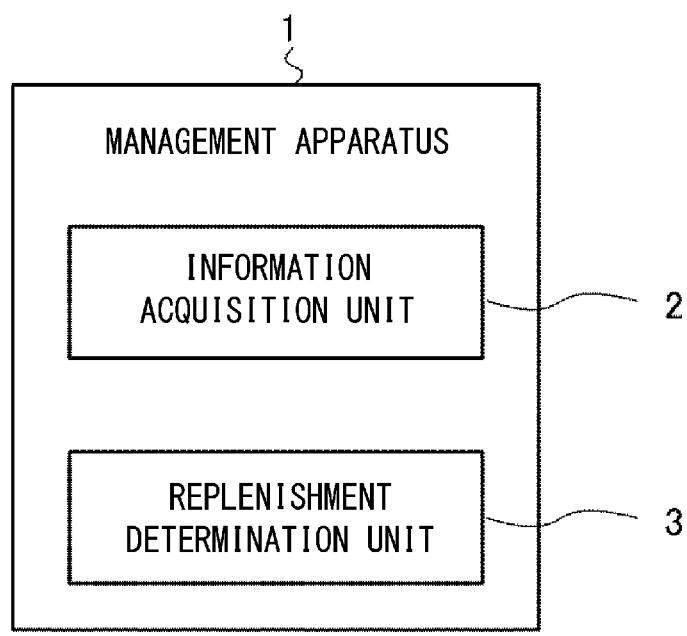
FIG. 1 is a block diagram showing one example of a configuration of a management apparatus according to an overview of embodiments.

Prior to giving a description of details of embodiments, an overview of the embodiments will be described. FIG. 1 is a block diagram showing one example of a configuration of a management apparatus 1 according to the overview of the embodiments. The management apparatus 1 is an apparatus for performing control processing for replenishment of articles that have been consumed when articles stored in a storage container have been consumed. The articles are, for example, consumable articles that are consumed by, for example, a user removing these articles from a storage container. As shown in FIG. 1, the management apparatus 1 includes an information acquisition unit 2 and a replenishment determination unit 3.

The information acquisition unit 2 acquires consumption information, which is information indicating an amount of consumption of articles stored in a storage container. The information acquisition unit 2 may acquire, when different kinds of articles are stored in one storage container, information indicating an amount of consumption for each kind of article as the consumption information.

The replenishment determination unit 3 determines by which one of a first replenishment method and a second replenishment method the articles should be replenished based on the consumption information acquired by the information acquisition unit 2. The first replenishment method is a method for individually replenishing articles to a storage container in which the articles have been consumed using a picking robot. That is, the first replenishment method is a method for replenishing articles by the picking robot adding articles in the storage container in which the number of articles is smaller than that in an initial state. The articles are repeatedly added until the number of articles reaches a predetermined number (the number in the initial state). In the first replenishment method, another robot (e.g., a conveyance robot 300 that will be described later) may be further used to convey the storage container. Further, the second replenishment method is a method for replacing a storage container where articles have been consumed by a storage container where a predetermined number of articles are stored. That is, the second replenishment method is a method in which articles are replenished by replacing a first storage container in which the number of articles is smaller than that in the initial state by a second new storage container in which a predetermined number of articles (the number of articles in the initial state) are stored. That is, in this method, a picking robot is not used. In the second replenishment method, another robot (e.g., a conveyance robot 300 that will be described later) may be used to transport the storage containers.

Figure 2:
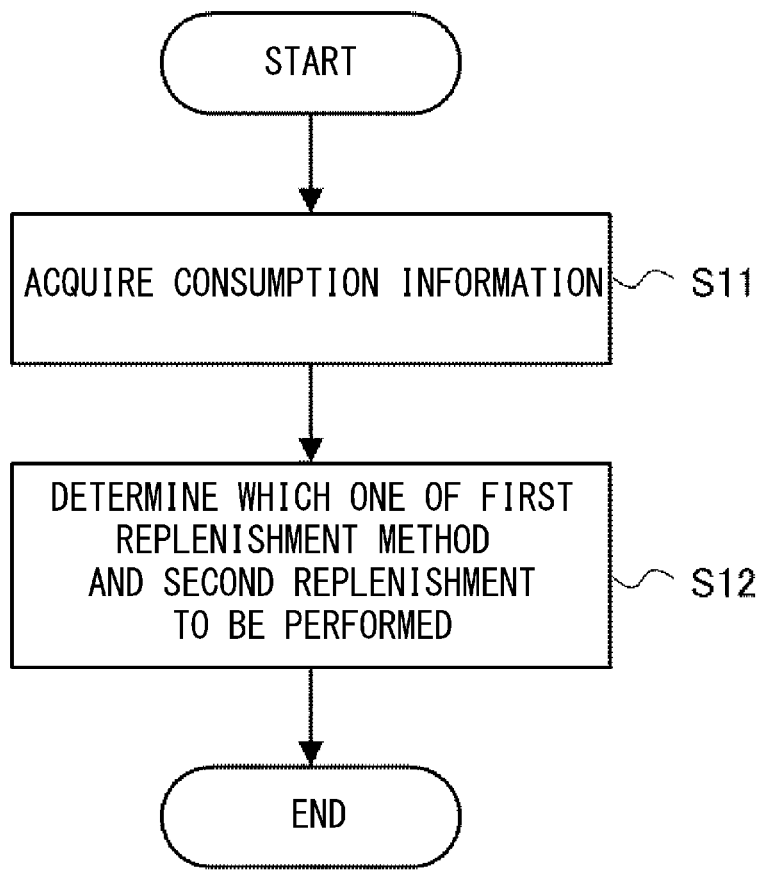
FIG. 2 is a flowchart showing one example of a flow of an operation of the management apparatus according to the overview of the embodiments.

FIG. 2 is a flowchart showing one example of a flow of an operation of the management apparatus 1 according to the overview of the embodiments. Hereinafter, with reference to FIG. 2, an example of a flow of the operation of the management apparatus 1 will be described.

First, in Step S11, the information acquisition unit 2 acquires consumption information regarding one storage container.

Next, in Step S12, the replenishment determination unit 3 determines which one of the first replenishment method and the second replenishment method is to be performed based on the consumption information acquired in Step S11.

As described above, the management apparatus 1 according to the overview of the embodiments has been described above. For example, if articles are replenished using a picking robot when the amount of consumption of the articles is large, a time required for the replenishment increases, which reduces the efficiency of the replenishing work. On the other hand, if a storage container is replaced by another storage container when the amount of consumption of the articles is small, a large number of articles remain in the storage container which has been replaced, which also reduces the efficiency of the replenishing work. Further, if, for example, a storage container is replaced by another storage container when there is a variation in the amount of consumption for each kind of article in a storage container that stores different kinds of articles, a large number of some kinds of articles remain in the storage container which has been replaced, which also reduces the efficiency of the replenishing work. Further, when articles are replenished using a picking robot, the larger the number of articles to be replenished that require a large working cost to pick them up, the lower the working efficiency. On the other hand, according to the management apparatus 1, the replenishment method is flexibly switched depending on the state of the consumption of articles. It is therefore possible to prevent inefficient replenishment from being performed.

Next, details of the embodiments will be described.

First Embodiment

Figure 3:
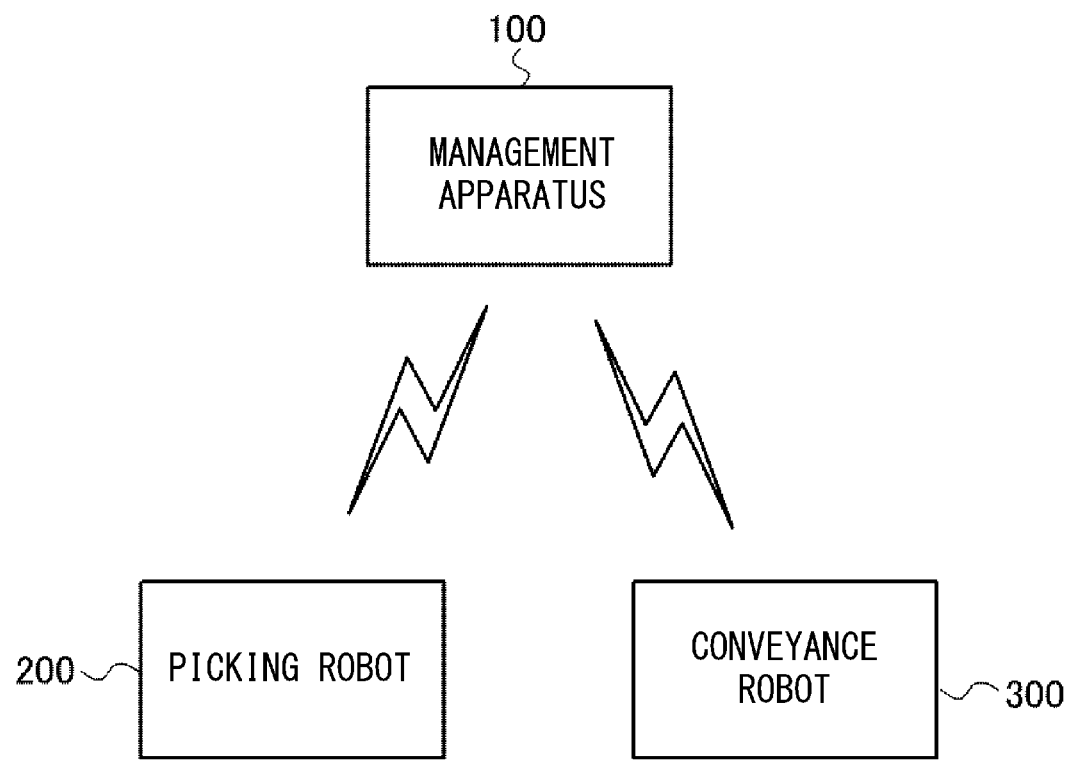
FIG. 3 is a schematic view showing one example of a configuration of an article management system according to a first embodiment.

First, a first embodiment will be described. FIG. 3 is a schematic view showing one example of a configuration of an article management system 10 according to the first embodiment. The article management system 10 is a system for performing processing for replenishing consumed articles when articles stored in a storage container have been consumed. While the storage container is a storage box that will be described later as one example in this embodiment, it is sufficient that the storage container be able to contain articles and is not limited to the storage box.

As shown in FIG. 3, the article management system 10 includes a management apparatus 100, a picking robot 200, and a conveyance robot 300. The management apparatus 100 is connected to each of the picking robot 200 and the conveyance robot 300 in such a way that they can communicate with each other via a wire or wirelessly. As necessary, the picking robot 200 and the conveyance robot 300 may be connected to each other in such a way that they can communicate with each other via a wire or wirelessly.

The management apparatus 100, which corresponds to the management apparatus 1 shown in FIG. 1, is an apparatus for performing control processing for replenishment of articles stored in the storage box. The details of the management apparatus 100 will be described later. Articles used by a user are stored in the storage box. The articles stored in the storage box are, for example, consumable articles such as groceries or daily necessities. The user takes out articles stored in the storage box for use. Accordingly, the number of articles stored in the storage box decreases. While the storage box is accommodated, for example, in a shelf installed in a living space of the user in this embodiment, the storage box may not be necessarily accommodated in a shelf.

Figure 4:
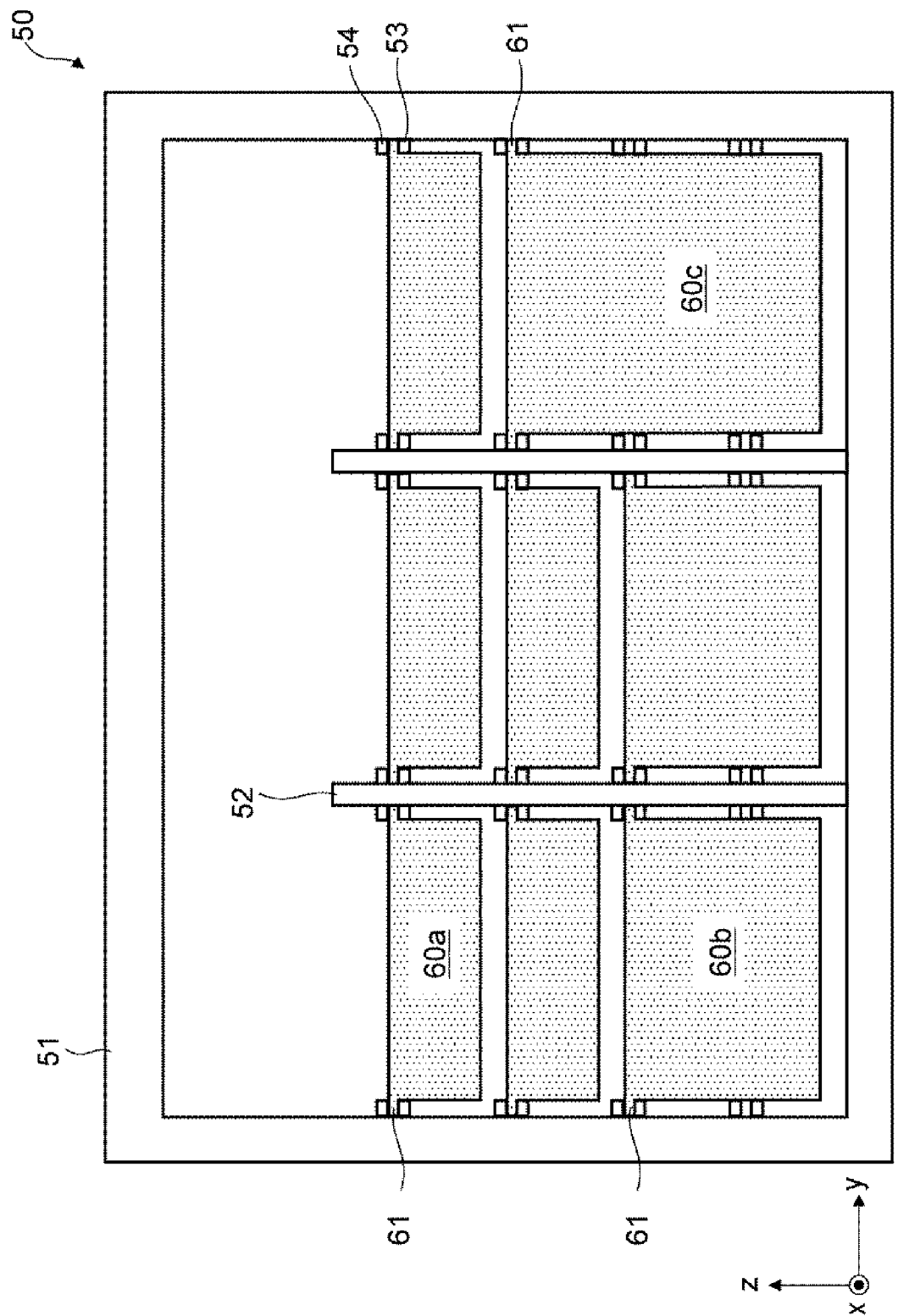
FIG. 4 is a schematic front view showing one example of a configuration of a shelf that accommodates storage boxes.

FIG. 4 is a schematic front view showing one example of a configuration of a shelf 50 that accommodates storage boxes. The shelf 50, which is a shelf that accommodates the storage boxes, is installed, for example, in a living space of a house. The house herein includes an apartment house, an office building or the like, and the living space includes an office space. As shown in FIG. 4, the shelf includes storage boxes 60a-60c for storing consumable articles. The storage boxes 60a-60c have sizes different from one another. Hereinafter, when it is not necessary to distinguish between the storage boxes 60a-60c, they are referred to as storage box(es) 60.

As shown in FIG. 4, the shelf 50 includes a housing 51, partition plates 52, rails 53, and lock mechanisms 54.

The right-handed XYZ orthogonal coordinates shown in FIG. 4 are used for the sake of convenience to illustrate the positional relation among components. In general, the Z-axis positive direction is vertically upward and the XY-plane is a horizontal plane. Further, FIG. 4 is a front view, and the storage boxes 60 are hatched for easy understanding. Further, the configuration of the shelf 50 shown in FIG. 4 is merely one example and a shelf having another configuration capable of accommodating the storage boxes may instead be used.

The housing 51 constitutes the outer frame of the shelf 50. In the example shown in FIG. 4, the housing 51 has a frame structure in which a top plate provided on a side in the Z-axis positive direction, a bottom plate provided on a side in the Z-axis negative direction, and side plates provided on a side in the Y-axis positive direction and on a side in the Y-axis negative direction are integrally formed. That is, the front and back surfaces of the housing 51 are open so that the storage boxes 60 can be taken in and out.

Doors that can be opened and closed may be provided on the front and back surfaces of the open housing 51. Further, the front surface or the back surface of the housing 51 may be closed.

As shown in FIG. 4, the partition plates 52 are provided so as to be parallel to the side plates that form the housing 51 (that is, parallel to the XZ-plane), and are extended from the front surface to the back surface of the open housing 51.

Here, the partition plates 52 are provided so that the distance between the side plates of the housing 51 and the adjacent partition plates 52 and the distance between the partition plates 52 are equal to each other.

While two partition plates 52 are provided and three rows of the accommodation location for the storage boxes 60 are provided in the example shown in FIG. 4, the number of partition plates 52 is not particularly limited. Further, the partition plates 52 may not be provided, and one row of the accommodation location for the storage boxes 60 may be provided.

As shown in FIG. 4, a plurality of pairs of rails 53 are extended in a depth direction (X-axis direction) and each of the rails 53 is arranged at equal intervals in a height direction (z-axis direction) on the inner surfaces of the housing 51 and the partition plates 52. The rails 53 are provided so as to rise substantially vertically from the inner surfaces of the housing 51 and the partition plates 52. In the example shown in FIG. 4, four pairs of rails 53 are provided in each row and four storage boxes 60a having the smallest size can be stored in each row.

As a matter of course, the number of rails 53 is not particularly limited. Further, it is sufficient that the rails 53 be able to support the storage boxes 60 and the rails 53 may be discontinuously provided in the depth direction (x-axis direction). Alternatively, instead of the rails 53, short supports may be provided so as to be aligned in the depth direction (x-axis direction).

Brims 61 are provided on the respective sides of the storage boxes 60, and the brims 61 are supported by the pair of rails 53 adjacent and opposed to each other from below, whereby the storage boxes 60 are supported in the shelf 50. The brims 61 are protruding parts that protrude outward from the storage boxes 60 in a width direction. The brims 61 are provided on the respective sides of the storage boxes 60 from the front surface to the back surface. The brims 61 are slid on the pair of rails 53, whereby it is possible to take in and out the storage boxes 60.

As described above, the shelf 50 can accommodate all the storage boxes 60 of a predetermined plurality of sizes while supporting the storage boxes 60 so that the storage boxes 60 can be slid along each of the pairs of rails 53.

The lock mechanism 54 is provided on the upper side of each pair of the rails 53. The lock mechanism 54 locks the storage boxes 60 accommodated in the shelf 50 and their lids (not shown) to the housing 51, and can prevent the storage boxes 60 and consumable articles stored inside the storage boxes 60 from being stolen. The shelf 50 may not necessarily include the lock mechanisms 54. Further, the storage boxes 60 may not necessarily include lids.

In this embodiment, the storage boxes 60a-60c of the predetermined plurality of sizes have the same width in the y-axis direction and the same depth in the x-axis direction. However, the storage boxes 60a-60c have different heights in the z-axis direction. The height of the storage box 60a having the smallest size is designed so as to match the distance between the rails 53 that are adjacent to each other in the z-axis direction. As a matter of course, the height of the storage box 60a having the smallest size is smaller than the distance between the rails 53 described above. The height of the storage box 60b having the intermediate size is designed to be about twice the height of the storage box 60a. Further, the height of the storage box 60c having the largest size is de signed to be about three times the height of the storage box 60a.

That is, the heights of the storage boxes 60a-60c of the predetermined plurality of sizes are designed to be approximately an integral multiple of the distance between the rails 53 that are adjacent to each other in the z-axis direction.

While the storage boxes have three different sizes in the example shown in FIG. 4, the storage boxes may be of one size, two different sizes, or four or more different sizes. In the example shown in FIG. 4, in addition to the storage boxes 60a-60c, for example, a storage box having a height of about four times the height of the storage box 60a may be provided.

Consumable articles such as groceries or daily necessities are, for example, stored inside the storage boxes 60. The consumable articles stored inside the storage boxes 60 are replenished by the first replenishment method or the second replenishment method at a predetermined timing.

Next, the picking robot 200 will be described. The picking robot 200 is a robot that picks up articles and replenishing them in the storage boxes 60 based on an instruction by the management apparatus 100.

Figure 5:
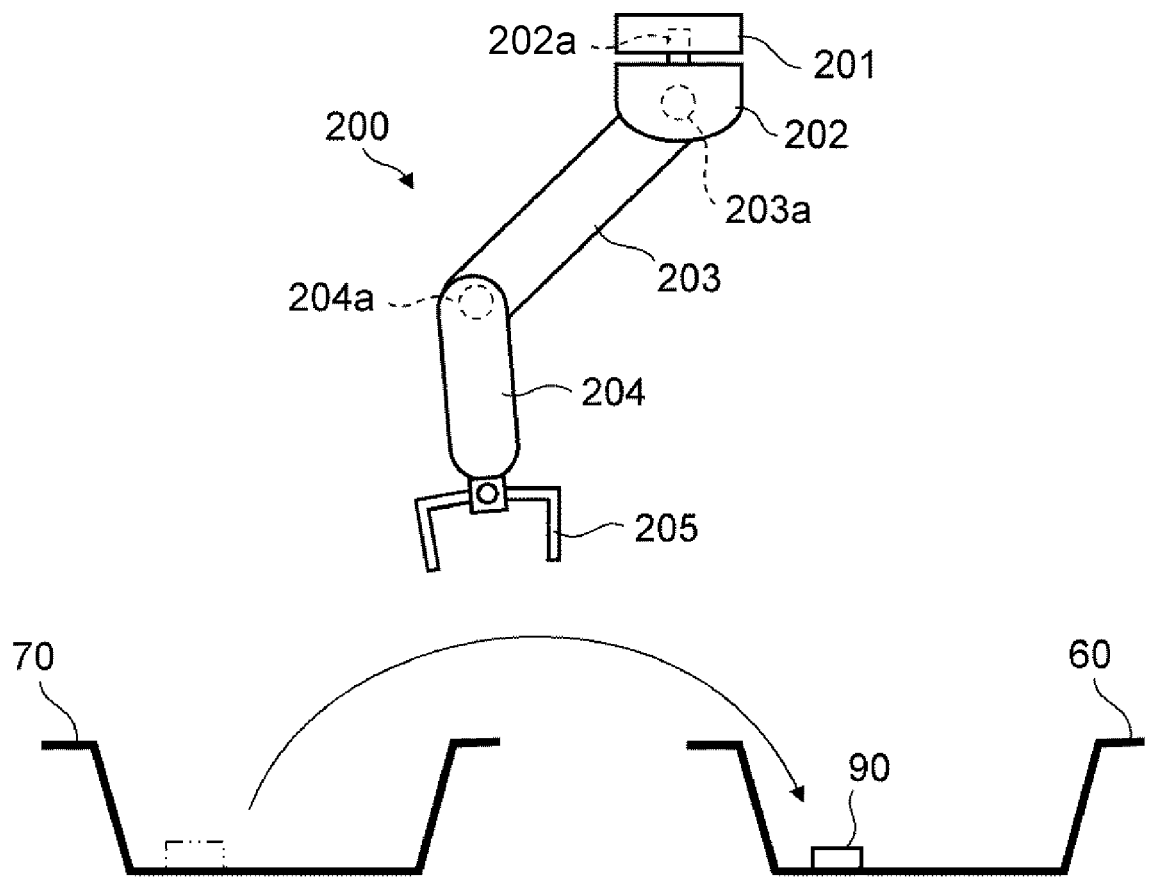
FIG. 5 is a schematic side view showing one example of a configuration of a picking robot.

FIG. 5 is a schematic side view showing one example of a configuration of the picking robot 200.

The picking robot 200 is a manipulator including a base part 201, a link root part 202, a first link 203, a second link 204, an end effector 205. The picking robot 200 picks up an article 90 by the end effector 205 and puts the article 90 into the storage box 60. FIG. 5 shows a state in which the article 90 is transferred from a storage box 70 for delivering the article 90 to the storage box 60. As the storage box 70 for delivering articles, the storage box 60 may be used. The article 90 is put in the storage box 70 in advance at a logistics center or the like.

The configuration of the end effector 205 is not limited as long as the end effector 205 is able to pick up the article. For example, the end effector 205 may pick up this article by gripping this article or by adsorbing this article. Further, while the link mechanism is formed of two links, the first link 203 and the second link 204, in the example shown in FIG. 5, the link mechanism may be formed of three or more links.

The base part 201 is fixed to a desired place. The base part 201 may be fixed to, for example, a top plate that forms the housing 51 of the shelf 50 or may be fixed to the wall or a floor surface in the living space of the house.

The link root part 202 is coupled to the base part 201 via a rotation shaft 202a so as to be rotatable around the rotation shaft 202a. The rotation shaft 202a of the link root part 202 is an axis perpendicular to the surface to which the base part 201 is fixed. The link root part 202 is rotationally driven by a motor or the like that is not shown.

The first link 203 is pivotably coupled to the link root part 202 via a first joint part 203a provided at the rear end of the first link 203. Further, the second link 204 is pivotably coupled to the front end of the first link 203 via a second joint part 204a provided at the rear end of the second link 204. The end effector 205 is coupled to the front end of the second link 204.

The rotation axes of the first joint part 203a and the second joint part 204a are parallel to the surface to which the base part 201 is fixed. In the example shown in FIG. 5, the height of the end effector 205 can be changed by pivoting the first link 203 and the second link 204. The first link 203 and the second link 204 are each rotationally driven by a motor or the like that is not shown.

With the aforementioned configuration, the article 90 can be replenished in the storage box 60 by the picking robot 200.

Although not shown, the picking robot 200 also includes, for example, a processor such as a Central Processing Unit (CPU) and a memory that stores various control programs, data and the like. That is, the picking robot 200 has a function as a computer, and executes various kinds of control processing based on the aforementioned various control programs and the like.

Next, the conveyance robot 300 will be described. The conveyance robot 300 is a robot that conveys the storage boxes 60 and 70 based on an instruction from the management apparatus 100.

In this embodiment, the conveyance robot 300 conducts the following conveyance for replenishment of articles by the picking robot 200. The conveyance robot 300 conveys the storage boxes 60 accommodated in the shelf 50 to an area where the picking robot 200 works. Further, the conveyance robot 300 conveys the storage box 70 that stores articles in advance from a predetermined place such as a logistics center to the area where the picking robot 200 works. Then, after the replenishing work by the picking robot 200 is completed, the conveyance robot 300 conveys the storage boxes 60 in which articles have been replenished to a predetermined accommodation location in the shelf 50. Further, the conveyance robot 300 conveys the storage box 70 from which articles have been taken out to a predetermined place such as a logistics center.

Further, in this embodiment, the conveyance robot 300 conducts the following conveyance for the replenishment performed by replacing the storage box where articles have been consumed by a storage box 60 where a predetermined number of articles are stored. The conveyance robot 300 conveys a storage box 60 where a predetermined number of articles are stored from a predetermined place such as a logistics center to a predetermined accommodation location in the shelf 50. Further, the conveyance robot 300 conveys the storage box 60 that is accommodated in the shelf 50 and is to be replaced by another storage box to a predetermined place such as a logistics center.

The storage box may be conveyed by a plurality of conveyance robots 300 passing the storage box from one conveyance robot 300 to another conveyance robot 300. The storage box may be conveyed using, for example, a conveyance robot 300 that carries out conveyance between the logistics center and a place near the living space and a conveyance robot 300 that carries out conveyance in the living space.

As described above, in this embodiment, replenishment by the picking robot or replenishment by replacing a storage box by another storage box is performed while using the conveyance robot 300 that conveys storage boxes. However, the conveyance robot 300 may not necessarily be provided. That is, the storage boxes may be conveyed by a person (operator).

Figure 6:
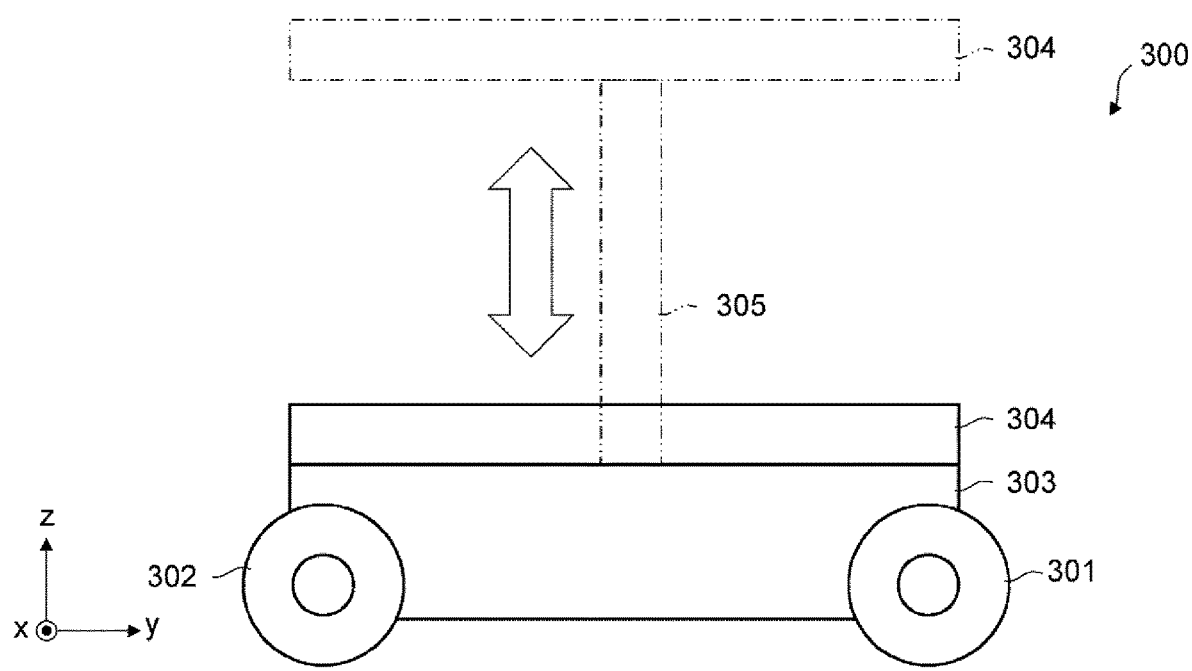
FIG. 6 is a schematic side view showing one example of a configuration of a conveyance robot.

FIG. 6 is a schematic side view showing one example of the configuration of the conveyance robot 300. The conveyance robot 300 shown in FIG. 6 is an autonomous traveling vehicle that takes the storage boxes 60 in and out from the shelf 50 and conveys the storage boxes 60. The conveyance robot 300 may perform a similar operation on the storage box 70.

As shown in FIG. 6, the conveyance robot 300 includes wheels 301 and 302, a body part 303, a top plate 304, and a support column 305.

The two pairs of wheels 301 and 302 are rotatably fixed to the lower side of the body part 303 and are driven by a drive source (not shown) such as a motor.

As shown in FIG. 6, the top plate 304 is coupled to the body part 303 via the support column 305 capable of expanding and contracting. The top plate 304 is coupled to the upper end of the support column 305 and the conveyance robot 300 places the storage boxes 60 on the top plate 304 to convey the storage boxes 60.

The support column 305 has, for example, a telescopic type expansion and contraction mechanism, and is expanded and contracted by a drive source (not shown) such as a motor. As shown by the white arrow in FIG. 6, the height of the top plate 304 can be changed by changing the length of the support column 305. Therefore, the storage boxes 60 can be taken in and out at any accommodation location in the shelf 50.

The conveyance robot 300 includes, for example, a manipulator (not shown), and the manipulator moves the storage boxes 60 from the shelf 50 onto the top plate 304. The manipulator of the conveyance robot 300 also moves the storage boxes 60 on the top plate 304 to the shelf 50.

Although not shown, the conveyance robot 300 also includes, for example, a processor such as a Central Processing Unit (CPU) and a memory that stores various control programs, data and the like. That is, the conveyance robot 300 also has a function as a computer, and executes various kinds of control processing based on the aforementioned various control programs and the like.

Figure 7:
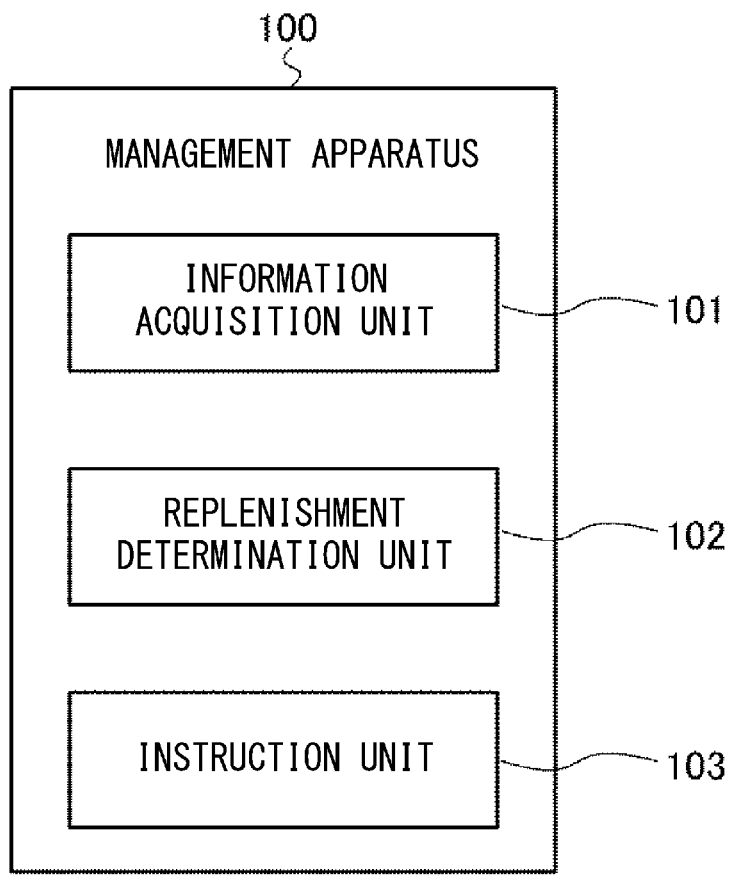
FIG. 7 is a block diagram showing one example of a functional configuration of a management apparatus according to the first embodiment.

Next, details of the management apparatus 100 will be described. FIG. 7 is a block diagram showing one example of a functional configuration of the management apparatus 100. As shown in FIG. 7, the management apparatus 100 includes an information acquisition unit 101, a replenishment determination unit 102, and an instruction unit 103.

The information acquisition unit 101 corresponds to the information acquisition unit 2 shown in FIG. 1. The information acquisition unit 101 acquires consumption information, which is information indicating the amount of consumption of articles stored in the storage boxes 60. For example, the information acquisition unit 101 acquires consumption information regarding one of the storage boxes 60 accommodated in the shelf 50 that has been selected. Note that this selection may be conducted in accordance with a predetermined selection rule. For example, the storage boxes 60 accommodated in the shelf 50 are selected in series. The information acquisition unit 101 acquires, when different kinds of articles are stored in one storage box 60, information indicating the amount of consumption for each kind of article as consumption information. The consumption information is updated, for example, regularly, and the information acquisition unit 101 regularly acquires the consumption information.

The information acquisition unit 101 may acquire the consumption information by a desired method. For example, the information acquisition unit 101 may acquire the consumption information by receiving the consumption information by any other apparatus or may acquire the consumption information by loading the consumption information from a storage apparatus such as a memory of the management apparatus 100. The consumption information is generated in advance by a desired method. For example, the consumption information may be generated by performing image recognition processing on an image obtained by a camera capturing an image inside the storage box 60 and recognizing remaining articles. In this case, the management apparatus 100 may receive the image obtained by capturing an image inside the storage box 60 and then generate consumption information. That is, the management apparatus 100 may include a consumption information generation unit that analyzes the received image and generates consumption information. The method for generating the consumption information is not limited to the aforementioned method. For example, the consumption information may be generated based on the number of articles that have been consumed, the number of articles that have been consumed being input by a user via an input apparatus such as a keyboard or a pointing device. In this case as well, the consumption information may be generated by the management apparatus 100.

The replenishment determination unit 102 corresponds to the replenishment determination unit 3 shown in FIG. 1. The replenishment determination unit 102 determines, based on the consumption information acquired by the information acquisition unit 101, whether to individually replenish articles in the storage boxes 60 using the picking robot 200 or to replace the storage box 60 where articles have been consumed by a storage box 60 where a predetermined number of articles are stored. That is, the replenishment determination unit 102 determines, based on the consumption information acquired by the information acquisition unit 101, by which one of the aforementioned first replenishment method and the second replenishment method the articles should be replenished.

In this embodiment, the replenishment determination unit 102 determines, based on the magnitude of the amount of consumption specified from the consumption information, by which one of the first replenishment method and the second replenishment method the articles should be replenished. Specifically, the replenishment determination unit 102 makes a determination to replenish articles by the first replenishment method when the amount of consumption specified from the consumption information is smaller than the predetermined threshold. That is, in this case, the replenishment determination unit 102 makes a determination to individually replenish articles in the storage box 60 where the articles have been consumed (that is, the storage box 60 where the amount of consumption of the articles has been determined) using the picking robot 200. On the other hand, the replenishment determination unit 102 makes a determination to replenish articles by the second replenishment method when the amount of consumption specified from the consumption information is equal to or larger than the predetermined threshold. That is, in this case, the replenishment determination unit 102 makes a determination to replenish articles by replacing the storage box 60 where the articles have been consumed by a storage box 60 where a predetermined number of articles are stored.

When different kinds of articles are contained together in one storage box 60, the amount of consumption compared with the predetermined threshold is, for example, the total amount of consumption for each kind of article contained together in the storage boxes 60. However, if different kinds of articles are contained together in one storage box 60, the amount of consumption compared with the predetermined threshold may be the amount of consumption of any noticeable kind of article. In this case, when the amount of consumption is smaller than the predetermined threshold, not only the noticeable kind of article but also the other kinds of articles are replenished by using the picking robot 200.

The instruction unit 103 outputs an instruction for performing replenishment of articles in accordance with the replenishment method determined by the replenishment determination unit 102. That is, when it has been determined to replenish articles by the first replenishment method, the instruction unit 103 outputs an instruction for individually replenishing articles. Specifically, in this case, for example, the instruction unit 103 sends an instruction for causing the picking robot 200 to transfer consumed articles from the storage box 70 that stores articles in advance to the storage box 60 where the articles have been consumed to the picking robot 200. Prior to sending the instruction to the picking robot 200, the instruction unit 103 may send an instruction for causing the conveyance robot 300 to convey the storage box 60 where the articles have been consumed to the area where the picking robot 200 works to the conveyance robot 300. Likewise, the instruction unit 103 may send an instruction for causing the conveyance robot 300 to convey the storage box 70 that stores articles in advance at a predetermined place such as a logistics center to the area where the picking robot 200 works to the conveyance robot 300. The instruction unit 103 may send an instruction for causing the conveyance robot 300 to convey the storage box 70 to a predetermined place such as a logistics center to the conveyance robot 300 after the work performed by the picking robot 200 is completed, or may send an instruction for causing the conveyance robot 300 to convey the storage box 60 where the replenishment has been completed to the shelf 50 to the conveyance robot 300.

Further, when it has been determined to replenish articles by the second replenishment method, the instruction unit 103 outputs an instruction for replacing the storage box 60 by another storage box 60. Specifically, in this case, for example, the instruction unit 103 sends an instruction for causing the conveyance robot 300 to convey a storage box 60 that stores articles in advance at a predetermined place such as a logistics center to the shelf 50 to the conveyance robot 300. Further, the instruction unit 103 sends an instruction for causing the conveyance robot 300 to convey the storage box 60 where the articles have been consumed from the shelf 50 to a predetermined place such as a logistics center to the conveyance robot 300.

Figure 8:
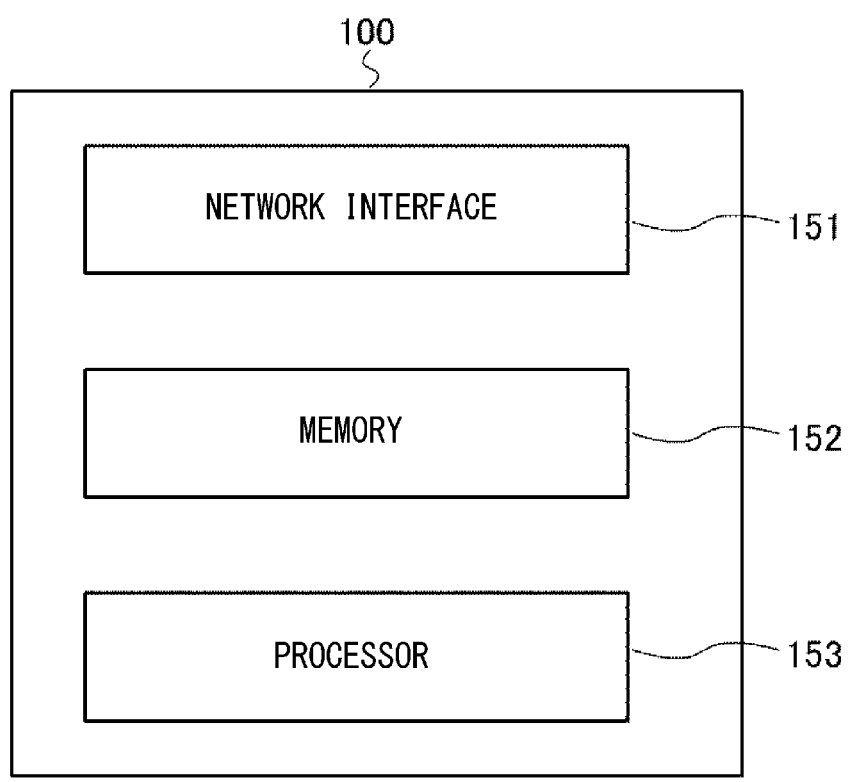
FIG. 8 is a block diagram showing one example of a hardware configuration of a management apparatus according to the embodiments.

FIG. 8 is a block diagram showing one example of a hardware configuration of the management apparatus 100. As shown in FIG. 8, the management apparatus 100 includes a network interface 151, a memory 152, and a processor 153.

The network interface 151 is used to communicate with a desired apparatus such as the picking robot 200 and the conveyance robot 300. The network interface 151 may include, for example, a network interface card (NIC).

The memory 152 is formed of, for example, a combination of a volatile memory and a non-volatile memory. The memory 152 is used to store a program executed by the processor 153, data used for various kinds of processing of the management apparatus 100 and the like.

The processor 153 loads a program from the memory 152 and executes the loaded program, thereby performing processing of each of the components shown in FIG. 7. The processor 153 may be, for example, a microprocessor, a Micro Processor Unit (MPU), a Central Processing Unit (CPU) or the like. The processor 153 may include a plurality of processors.

As described above, the management apparatus 100 includes a function as a computer.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Figure 9:
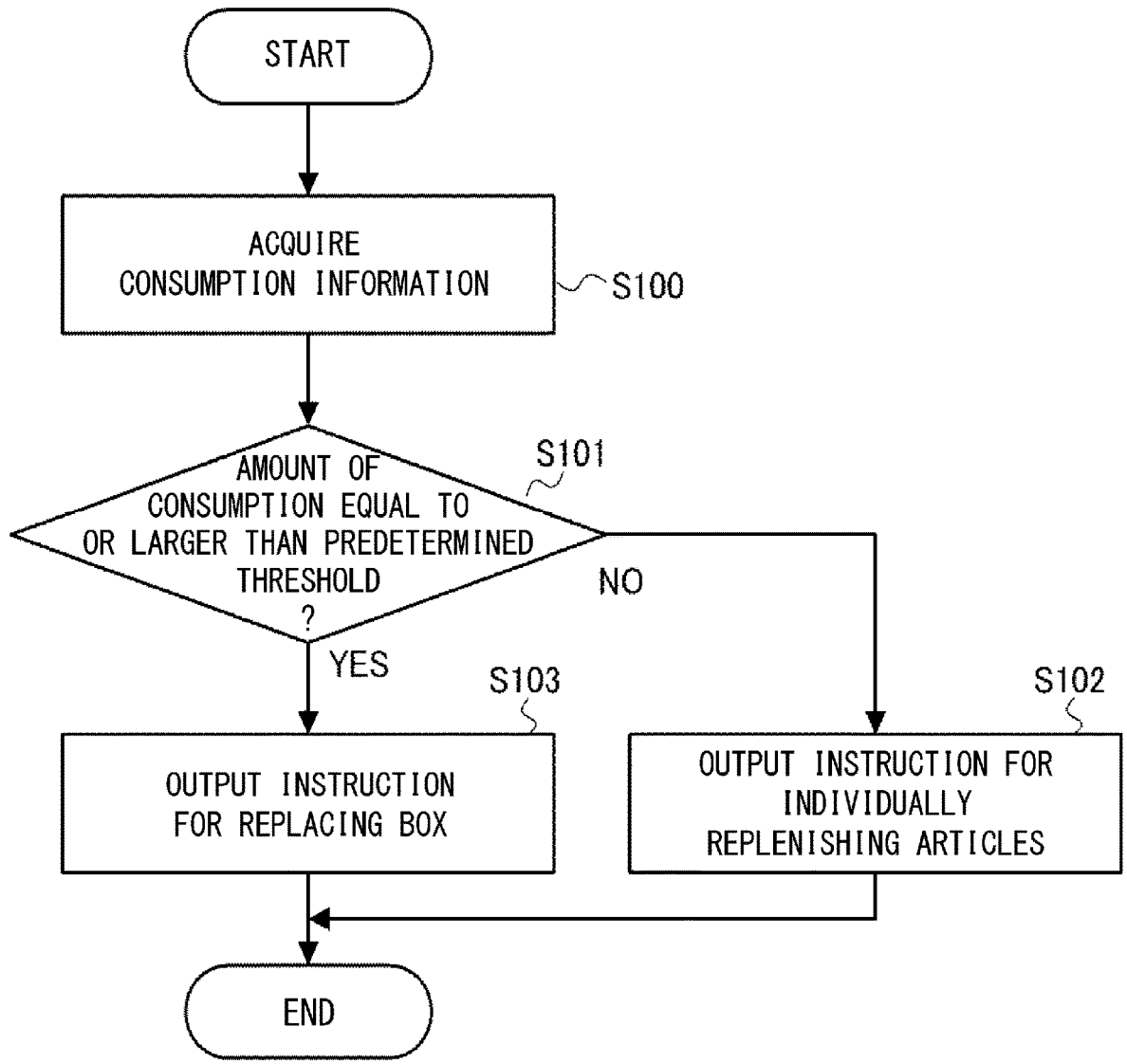
FIG. 9 is a flowchart showing one example of an operation of the management apparatus according to the first embodiment.

Next, a flow of an operation of the management apparatus 100 will be described. FIG. 9 is a flowchart showing one example of the operation of the management apparatus 100. Hereinafter, with reference to FIG. 9, a flow of the operation of the management apparatus 100 will be described.

In Step S100, the information acquisition unit 101 acquires consumption information regarding the storage box 60 accommodated in the shelf 50.

Next, in Step S101, the replenishment determination unit 102 compares the amount of consumption specified from the consumption information acquired in Step S100 with a predetermined threshold. When the amount of consumption specified from the consumption information is smaller than the predetermined threshold (NO in Step S101), the replenishment determination unit 102 makes a determination to replenish articles by the first replenishment method. In this case, the processing proceeds to Step S102. On the other hand, when the amount of consumption specified from the consumption information is equal to or larger than the predetermined threshold (YES in Step S101), the replenishment determination unit 102 makes a determination to replenish articles by the second replenishment method. In this case, the process proceeds to Step S103.

In Step S102, the instruction unit 103 outputs an instruction for individually replenishing articles.

On the other hand, in Step S103, the instruction unit 103 outputs an instruction for replacing the storage box 60 by another storage box 60.

The first embodiment has been described above. In this embodiment, the replenishment method is determined based on the magnitude of the amount of consumption specified from the consumption information. That is, it is possible to switch whether to replace a storage box itself by another storage box or individually replenish articles by the picking robot 200 in accordance with the amount of consumption. For example, if a storage box is replaced by another storage box although a number of articles remain therein, a number of articles return to a predetermined place such as a logistics center along with the storage box. On the other hand, in this embodiment, as described above, the replenishment method is switched in accordance with the amount of consumption, whereby it is possible to prevent a storage box in which a number of articles remain from being replaced by another storage box. It is therefore possible to prevent inefficient replenishment from being performed.

Second Embodiment

Next, a second embodiment will be described. The method for determining the replenishment method based on consumption information in this embodiment is different from that in the aforementioned first embodiment. Specifically, in this embodiment, the replenishment method is determined based on the magnitude of the variation of the amount of consumption for each kind of article specified from the consumption information. Hereinafter, points that are different from those in the first embodiment will be described and overlapping descriptions will be omitted as appropriate.

Figure 10:
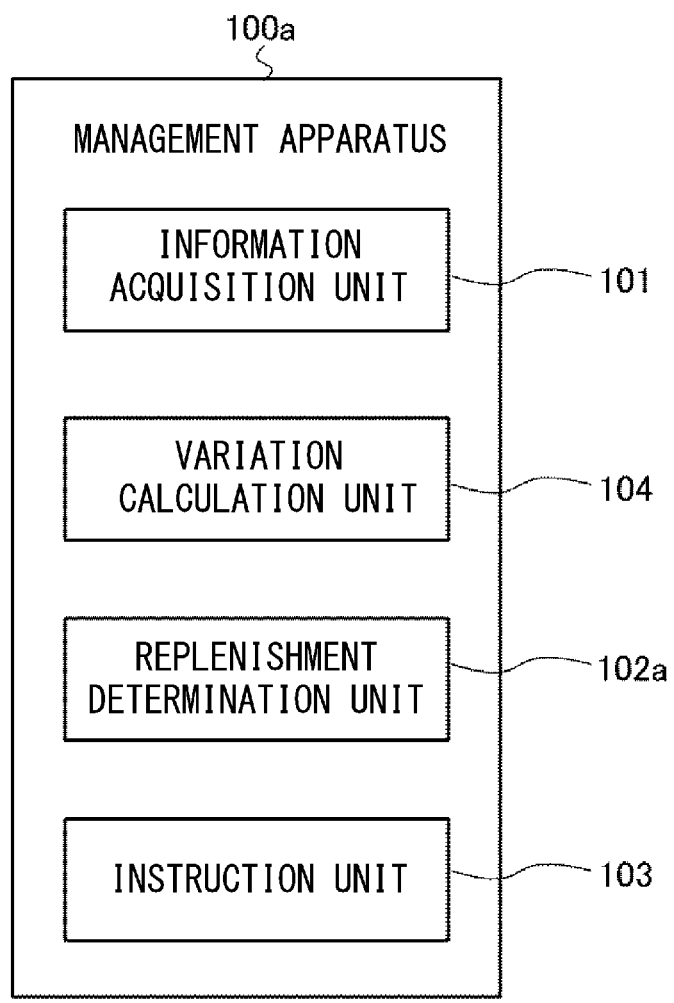
FIG. 10 is a block diagram showing one example of a functional configuration of a management apparatus according to a second embodiment.

The article management system according to this embodiment includes a system configuration similar to that of the first embodiment except that the management apparatus 100 according to the first embodiment is replaced by a management apparatus 100a in this embodiment. FIG. 10 is a block diagram showing one example of a functional configuration of the management apparatus 100a according to the second embodiment. As shown in FIG. 10, the management apparatus 100a includes an information acquisition unit 101, a variation calculation unit 104, a replenishment determination unit 102a, and an instruction unit 103. That is, the management apparatus 100a is different from the management apparatus 100 according to the first embodiment in that the variation calculation unit 104 is added and the replenishment determination unit 102 is replaced by a replenishment determination unit 102a in the management apparatus 100a.

The variation calculation unit 104 calculates the magnitude of the variation of the amount of consumption for each kind of article from the consumption information. That is, the variation calculation unit 104 calculates the magnitude of the variation of the amount of consumption for each kind of article contained together in one storage box 60. It can be said that, in this calculation, the variation calculation unit 104 calculates the magnitude of the variation of the amount of the articles that should be replenished for each kind of article. In this embodiment, as one example, the variation calculation unit 104 calculates the magnitude of the variation of the amount of consumption for each kind of article as follows. FIG. 11 is a table for illustrating the calculation of the magnitude of the variation. FIG. 11 shows an example in which one storage box 60 regarding which the replenishment method is to be determined stores four kinds of articles, that is, articles A to D in advance. The variation calculation unit 104 first determines a remaining ratio for each kind of article based on the consumption information acquired by the information acquisition unit 101. The remaining ratio is expressed as a ratio of the current number of articles to the number of articles in the initial state. That is, the remaining ratio is expressed as a ratio of the number of articles that are currently remaining in the storage box to the number of articles that are contained in the storage box regarding which the replenishment method is to be determined in advance. Next, the variation calculation unit 104 calculates the standard deviation of the remaining ratio for each kind of article as the magnitude of the variation of the amount of consumption for each kind of article. Note that the variation calculation unit 104 may calculate the standard deviation using an index value calculated from the remaining ratio. For example, the variation calculation unit 104 may calculate the index value from the remaining ratio using the following expression. The symbol $R_1$ denotes a remaining ratio (a remaining ratio expressed as a decimal) and $R_2$ denotes an index value.

$$R_2 = (1-R_1) \times 10$$

As described above, in this embodiment, the variation calculation unit 104 specifically calculates the variation of the remaining ratio. The aforementioned method for calculating the variation is merely on example and the variation calculation unit 104 may calculate the magnitude of the variation by another method. Further, a standard deviation may be calculated, for example, by applying a weight to the index value R 2 of each kind of article in accordance with the article. Further, this weighting value may be specified by the user.

The replenishment determination unit 102a corresponds to the replenishment determination unit 3 shown in FIG. 1. The replenishment determination unit 102a determines, based on the consumption information acquired by the information acquisition unit 101, by which one of the aforementioned first replenishment method and the second replenishment method the articles should be replenished. Note that the replenishment determination unit 102a determines, based on the magnitude of the variation of the amount of consumption for each kind of article specified from the consumption information, by which one of the first replenishment method and the second replenishment method the articles should be replenished. Specifically, the replenishment determination unit 102a makes a determination to replenish articles by the first replenishment method when the magnitude of the variation calculated by the variation calculation unit 104 is equal to or larger than the predetermined threshold. That is, in this case, the replenishment determination unit 102a makes a determination to individually replenish articles in the storage box 60 where the articles have been consumed (that is, the storage box 60 where the amount of consumption of the articles has been determined) using the picking robot 200. On the other hand, the replenishment determination unit 102a makes a determination to replenish articles by the second replenishment method when the magnitude of the variation calculated by the variation calculation unit 104 is smaller than the predetermined threshold. That is, in this case, the replenishment determination unit 102a makes a determination to replenish articles by replacing the storage box where the articles have been consumed by a storage box 60 where a predetermined number of articles are stored.

Figure 12:
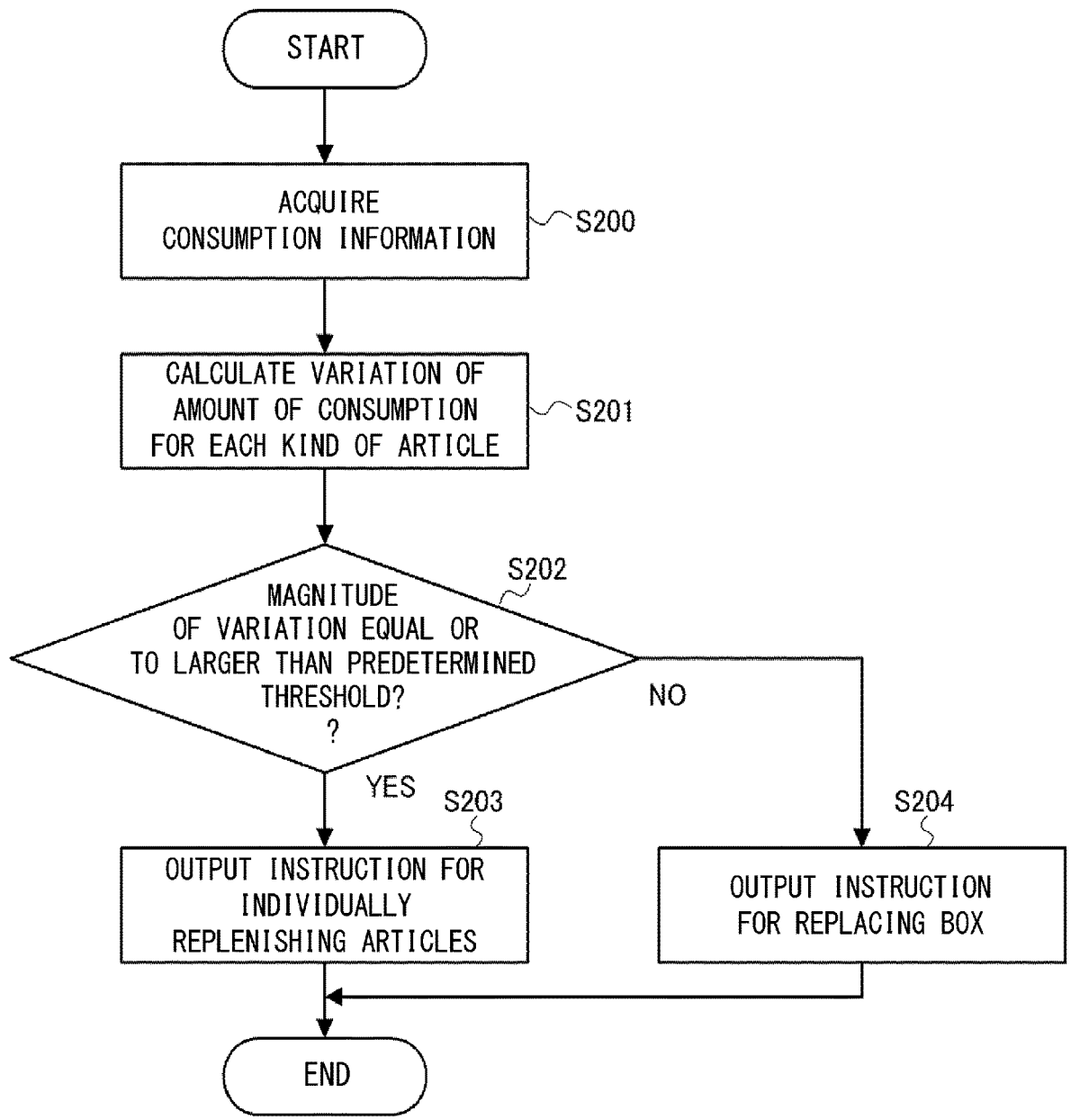
FIG. 12 is a flowchart showing one example of an operation of the management apparatus according to the second embodiment.

Next, a flow of an operation of the management apparatus 100a will be described. FIG. 12 is a flowchart showing one example of the operation of the management apparatus 100a. Hereinafter, with reference to FIG. 12, the flow of the operation of the management apparatus 100a will be described.

In Step S200, the information acquisition unit 101 acquires consumption information regarding the storage box 60 accommodated in the shelf 50.

Next, in Step S201, the variation calculation unit 104 calculates the variation of the amount of consumption for each kind of article from the consumption information acquired in Step S200.

Next, in Step S202, the replenishment determination unit 102a compares the magnitude of the variation calculated in Step S201 with a predetermined threshold. When the magnitude of the variation is equal to or larger than the predetermined threshold (YES in Step S202), the replenishment determination unit 102a makes a determination to replenish articles by the first replenishment method. In this case, the process proceeds to Step S203. On the other hand, when the magnitude of the variation is smaller than the predetermined threshold (NO in Step S202), the replenishment determination unit 102a makes a determination to replenish articles by the second replenishment method. In this case, the process proceeds to Step S204.

In Step S203, the instruction unit 103 outputs an instruction for individually replenishing articles.

On the other hand, in Step S204, the instruction unit 103 outputs an instruction for replacing the storage box 60 by another storage box 60.

The second embodiment has been described above. In this embodiment, the replenishment method is determined based on the magnitude of the variation of the amount of consumption for each kind of article specified from the consumption information. That is, it is possible to switch whether to replace a storage box itself by another storage box or individually replenish articles by the picking robot 200 in accordance with the magnitude of the variation. Therefore, according to this embodiment, it is possible to prevent a storage container in which a number of articles of a limited kind remain from being replaced by another storage container. It is therefore possible to prevent inefficient replenishment from being performed. The replenishment determination unit 102a may determine the replenishment method based on the magnitude of the variation of the amount of consumption and the magnitude of the amount of consumption. That is, the method for determining the replenishment method according to this embodiment may be combined with the method for determining the replenishment method according to the first embodiment. For example, the replenishment determination unit 102a may determine, when the magnitude of the variation of the amount of consumption for each kind of article is smaller than a predetermined threshold (first threshold), whether to employ replenishment by the second replenishment method in accordance with the magnitude of the amount of consumption instead of automatically making a determination to replenish articles by the second replenishment method (that is, replacement of a storage box by another storage box). That is, in this case, the replenishment determination unit 102a may make a determination to replenish articles by the second replenishment method (that is, replacement of a storage box by another storage box) only when the magnitude of the amount of consumption exceeds a predetermined threshold (second threshold). Accordingly, it is possible to prevent a storage box from being replaced by another storage box when very little of these articles is consumed.

Third Embodiment

Next, a third embodiment will be described. The method for determining the replenishment method based on the consumption information in this embodiment is different from that in the aforementioned first embodiment. Specifically, in this embodiment, as will be described later, the replenishment method is determined based on a working cost calculated from features of an article and the consumption information. Hereinafter, the points different from those in the first embodiment will be described and the overlapping descriptions will be omitted as appropriate.

Figure 13:
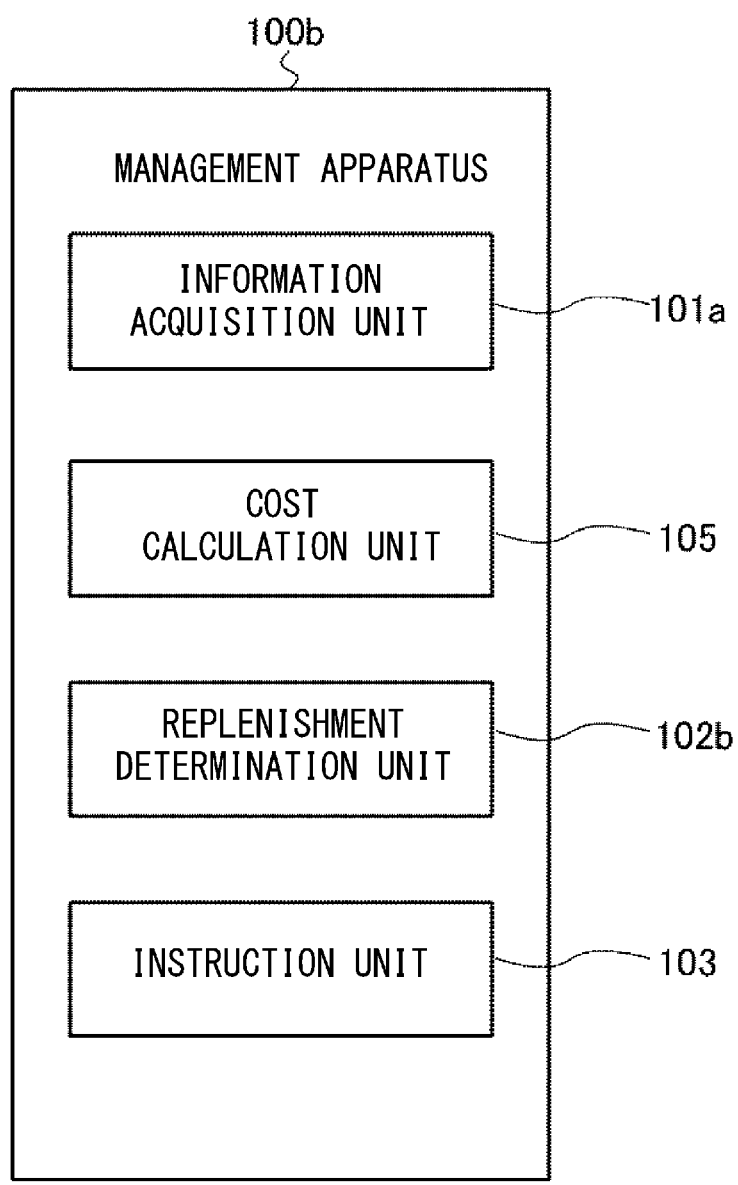
FIG. 13 is a block diagram showing one example of a functional configuration of a management apparatus according to a third embodiment.

The article management system according to this embodiment has a system configuration similar to that in the first embodiment except that the management apparatus 100 is replaced by a management apparatus 100b. FIG. 13 is a block diagram showing one example of a functional configuration of the management apparatus 100b according to the third embodiment. As shown in FIG. 13, the management apparatus 100b includes an information acquisition unit 101a, a cost calculation unit 105, a replenishment determination unit 102b, and an instruction unit 103. That is, the management apparatus 100b is different from the management apparatus 100 according to the first embodiment in that the cost calculation unit 105 is added, the information acquisition unit 101 is replaced by the information acquisition unit 101a, and the replenishment determination unit 102 is replaced by the replenishment determination unit 102b.

The information acquisition unit 101a is different from the aforementioned information acquisition unit 101 in that the information acquisition unit 101a further acquires, besides consumption information, feature information indicating features for each kind of article. The features of the article means features regarding a difficulty for the picking robot 200 to pick up the article. The feature information may specifically be information regarding a predetermined attribute that affects the difficulty for the picking robot 200 to pick up the article (that is, an attribute value of the predetermined attribute). It is sufficient that the attribute value be data and is not limited to a numerical value. For example, the predetermined attribute may be the weight of the article, the material of the article, or the shape of the article. That is, the feature information may be information indicating the weight of the article, information indicating the material of the article, or information indicating the shape of the article. The feature information may include only one or some of them or may include all of them. Further, the feature information may specifically be a difficulty itself for the picking robot 200 to pick up the article. In this case, the feature information is information indicating the difficulty for the picking robot 200 to pick up the article, that is, information indicating the working cost for the picking robot 200 to pick up one article. The working cost (the level of difficulty) is defined based on an attribute value of the aforementioned predetermined attribute that affects the difficulty of picking up the article.

The larger the weight of the article, the more difficult it is for the picking robot 200 to pick up the article. Further, there are, for example, the following relationships between a material of an article and the difficulty of picking it up. The more slippery the material, the more difficult it is for the picking robot 200 to pick up the article. Further, the more deformable the material, the more difficult it is for the picking robot 200 to pick up the article. Further, when the article is made of a material that contains fine irregularities, fabric, etc., it is difficult for the picking robot 200 that picks up the article by adsorbing it to pick up this article. This is because such materials are difficult to adsorb. Further, there is, for example, the following relationship between the shape of an article and the difficulty of picking up the article. For example, the more easily the article rolls over in view of its shape, the more difficult it is for the picking robot 200 to pick up the article. This is because, if the article has such a shape, the article moves when the end effector 205 contacts the article when the article is picked up. The attributes of a material that affect the level of difficulty of picking it up are not limited to the aforementioned attributes. The feature information may include, for example, other information such as information indicating the size of the article. Note that the attribute value of the predetermined attribute is defined in advance for each kind of article.

The information acquisition unit 101*a* may acquire feature information that has been prepared in advance for each kind of article by a desired method. The information acquisition unit 101*a* may acquire, for example, the feature information by receiving it from any other apparatus or may acquire the feature information by loading it from a storage apparatus such as a memory of the management apparatus 100*b*.

The cost calculation unit 105 calculates the cost of the work performed by the picking robot 200 for replenishment of articles by the picking robot 200 from the features of the articles and the consumption information. When the information acquisition unit 101*a* has acquired information indicating the attribute value of a predetermined attribute of each kind of article as feature information, the cost calculation unit 105 first determines the working cost for the picking robot 200 to pick up one article from feature information (specifically, attribute value) for each kind of article. FIG. 14 is a table showing a specific example of determination of the working cost for picking up one article. In the example shown in FIG. 14, the total value of a working cost $C_1$ which is based on the weight, a working cost $C_2$ which is based on the material, and a working cost $C_3$ which is based on the shape corresponds to the working cost for picking up one article. The cost calculation unit 105 determines, using, for example, a lookup table that associates the attribute value with the working cost and is defined in advance, the working cost from the attribute value that the information acquisition unit 101*a* has acquired. Note that the cost calculation unit 105 preferably determines the working cost in accordance with the specification of the picking robot 200. This is because, even when the same article is to be picked up, the difficulty of picking up varies depending on the specification of the picking robot 200. Therefore, for example, the cost calculation unit 105 refers to a lookup table in accordance with the specification of the picking robot 200 and determines the working cost for picking up an article. As described above, the information acquisition unit 101*a* may acquire the working cost itself for picking up one article (each value from $C_1$ to $C_3$ or the total value of $C_1$ to $C_3$) as feature information. In this case, the aforementioned processing, that is, processing for determining the working cost from the attribute value, is omitted.

The cost calculation unit 105 calculates the working cost in a case in which articles are replenished in the storage box 60 by the first replenishment method by performing computation using the working cost for picking up one article and the number of articles that should be replenished, this number of articles being specified from the consumption information. The cost calculation unit 105 specifically calculates the cost of the work performed by the picking robot 200 for achieving the first replenishment method (replenishment by the picking robot 200) as follows. The cost calculation unit 105 calculates the product of the working cost for picking up one article and the number of articles that have been consumed (the number of articles that should be replenished) for each kind of article and further calculates the total sum of the result of calculating the product for each kind of article. This total sum indicates the cost of the work performed by the picking robot 200 for achieving the first replenishment method (replenishment by the picking robot 200).

FIGS. 15 and 16 are tables showing specific examples of the calculation of the working cost. In the examples shown in FIGS. 15 and 16, the storage box whose articles are to be replenished is a storage box 60 that stores four kinds of articles, an articles A, an article B, an article C, and an article D. As shown in FIG. 14, the working cost for picking up one article A is 15, the working cost for picking up one article B is 7, the working cost for picking up one article C is 2, and the working cost for picking up one article D is 5.

It is assumed, in the example shown in FIG. 15, that it has been specified from the consumption information that the information acquisition unit 101*a* has acquired that only two articles C have been consumed in this storage box 60. That is, in the example shown in FIG. 15, it is assumed that only two articles C have been consumed compared to the initial state. Therefore, in the example shown in FIG. 15, the articles that should be replenished are only the articles C and the number of articles that should be replenished is 2. In this case, the working cost when articles are replenished in this storage box by the first replenishment method is calculated by computing the product of the working cost for picking up one article C (that is, 2) and the number of articles that should be replenished (that is, 2). As a result of this computation, the cost calculation unit 105 outputs 4 as the working cost for replenishing articles in this storage box by the first replenishment method.

Likewise, it is assumed, in the example shown in FIG. 16, that it has been specified from the consumption information that the information acquisition unit 101*a* has acquired that one article A has been consumed and two articles B have been consumed in this storage box 60. That is, it is assumed, in the example shown in FIG. 16, that one article A has been consumed and two articles B have been consumed compared to the initial state. Therefore, in the example shown in FIG. 16, articles that should be replenished are the articles A and the articles B, the number of articles A that should be replenished is 1 and the number of articles B that should be replenished is 2. In this case, the working cost when articles are replenished in this storage box by the first replenishment method is calculated by computing the sum of the working cost required to replenish the article A and the working cost required to replenish the articles B. The working cost required to replenish the article A is calculated by computing the product of the working cost for picking up one article A (that is, 15) and the number of articles that should be replenished (that is, 1). Further, the working cost required to replenish the article B is calculated by computing the product of the working cost for picking up one article B (that is, 7) and the number of articles that should be replenished (that is, 2). According to the aforementioned computations, the cost calculation unit 105 outputs 29 as the working cost when articles are replenished in this storage box by the first replenishment method.

The replenishment determination unit 102*b* corresponds to the replenishment determination unit 3 shown in FIG. 1. The replenishment determination unit 102*b* also determines, based on the consumption information acquired by the information acquisition unit 101, by which one of the aforementioned first replenishment method and the second replenishment method the articles should be replenished. More specifically, the replenishment determination unit 102*b* determines by which one of the first replenishment method and the second replenishment method the articles should be replenished based on the cost of the work performed by the picking robot 200 for replenishment of articles by the picking robot 200 (replenishment by the first replenishment method). That is, the replenishment determination unit 102*b* determines the replenishment method based on the working cost calculated by the cost calculation unit 105. Specifically, the replenishment determination unit 102*b* determines, when the working cost calculated by the cost calculation unit 105 is smaller than a predetermined threshold, to replenish articles by the first replenishment method. That is, in this case, the replenishment determination unit 102*b* makes a determination to individually replenish articles in a storage box 60 where the articles have been consumed (that is, the storage box 60 where the amount of consumption of the articles has been determined) using the picking robot 200. On the other hand, when the working cost calculated by the cost calculation unit 105 is equal to or larger than the predetermined threshold, the replenishment determination unit 102*b* makes a determination to replenish articles by the second replenishment method. That is, in this case, the replenishment determination unit 102*b* makes a determination to replenish articles by replacing a storage box 60 where the articles have been consumed by a storage box 60 where a predetermined number of articles are stored. When, for example, the value of the predetermined threshold is 10, articles are replenished by the first replenishment method in the example shown in FIG. 15 and articles are replenished by the second replenishment method in the example shown in FIG. 16.

Figure 17:
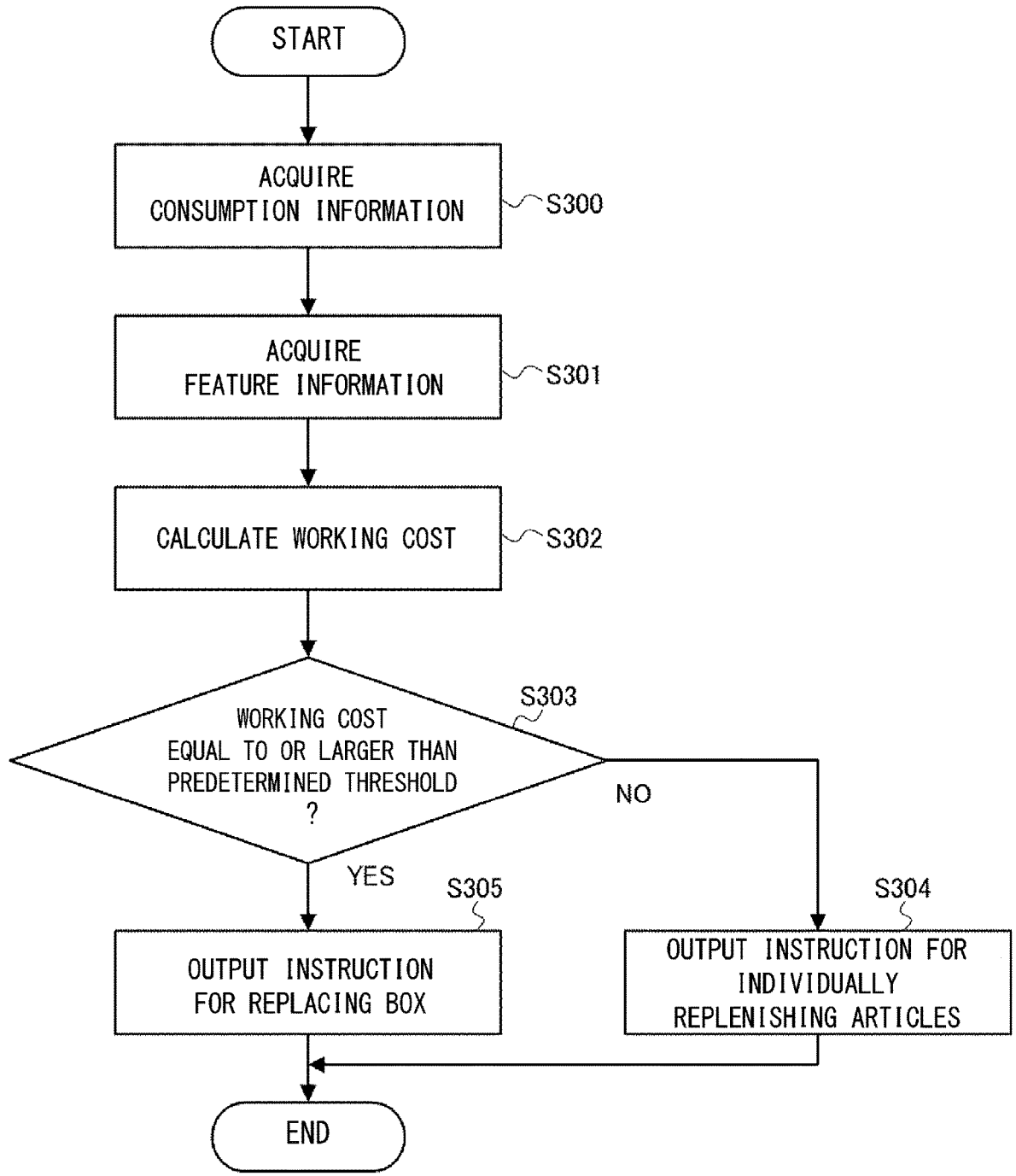
FIG. 17 is a flowchart showing one example of an operation of the management apparatus according to the third embodiment.

Next, a flow of an operation of the management apparatus 100*b* will be described. FIG. 17 is a flowchart showing one example of the operation of the management apparatus 100*b*. Hereinafter, with reference to FIG. 17, a flow of the operation of the management apparatus 100*b* will be described.

In Step S300, the information acquisition unit 101*a* acquires consumption information regarding the storage box 60 accommodated in the shelf 50.

Next, in Step S301, the information acquisition unit 101*a* acquires feature information on articles stored in the storage box 60. The order in which Step S300 and Step S301 are performed may be reversed or these steps may be concurrently performed.

Next, in Step S302, the cost calculation unit 105 calculates the working cost using the consumption information acquired in Step S300 and the feature information acquired in Step S301.

Next, in Step S303, the replenishment determination unit 102*b* compares the working cost calculated in Step S302 with a predetermined threshold. When the working cost is smaller than the predetermined threshold (NO in Step S303), the replenishment determination unit 102*b* makes a determination to replenish articles by the first replenishment method. In this case, the process proceeds to Step S304. On the other hand, when the working cost is equal to or larger than the predetermined threshold (YES in Step S303), the replenishment determination unit 102*b* makes a determination to replenish articles by the second replenishment method. In this case, the process proceeds to Step S305.

In Step S304, the instruction unit 103 outputs an instruction for individually replenishing articles.

On the other hand, in Step S305, the instruction unit 103 outputs an instruction for replacing the storage box 60 by another storage box 60.

The third embodiment has been described above. In this embodiment, the replenishment method is determined based on the cost of the work performed by the picking robot 200. That is, it is possible to switch whether to replace a storage box itself by another storage box or individually replenish articles by the picking robot 200 in accordance with the working cost. Therefore, according to this embodiment, the replenishment method is switched in accordance with the cost of the work performed by the picking robot 200. Therefore, it is possible to prevent inefficient replenishment from being performed in view of the cost of the work performed by the picking robot 200. Further, as described above, the replenishment determination unit 102*b* may determine the replenishment method based on the working cost in accordance with the weight of the article. In this case, it is possible to determine the replenishment method in view of the cost of the work performed by the picking robot 200 depending on the weight of the article. Further, as described above, the replenishment determination unit 102*b* may determine the replenishment method based on the working cost in accordance with the material of the article. In this case, it is possible to determine the replenishment method in view of the cost of the work performed by the picking robot 200 depending on the material of the article. Further, as described above, the replenishment determination unit 102*b* may determine the replenishment method based on the working cost in accordance with the shape of the article. In this case, it is possible to determine the replenishment method in view of the cost of the work performed by the picking robot 200 depending on the shape of the article.

Note that the replenishment determination unit 102*b* may determine the replenishment method based on the magnitude of the variation of the amount of consumption and the working cost. That is, the method for determining the replenishment method according to this embodiment may be combined with the method for determining the replenishment method according to the second embodiment. For example, the replenishment determination unit 102*b* may determine the replenishment method using the value of the working cost, the value of the magnitude of the variation of the amount of consumption for each kind of article, and the predetermined threshold. Specifically, for example, the replenishment determination unit 102*b* may make a determination to replenish articles by the second replenishment method when a value obtained by subtracting the value of the magnitude of the variation from the value of the working cost is equal to or larger than a predetermined threshold and make a determination to replenish articles by the first replenishment method when the above value is smaller than the predetermined threshold. Accordingly, it is possible to improve the efficiency of the replenishing work in view of two viewpoints, namely, the working cost and the variation.

Note that the present disclosure is not limited to the aforementioned embodiments and may be changed as appropriate without departing from the spirit of the present disclosure. For example, in order to meet user's requirements regarding the replenishment method, values of thresholds mentioned in each of the embodiments may be set in accordance with the user's requirements.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A management apparatus comprising:
   an information acquisition unit configured to acquire consumption information, which is information indicating an amount of consumption of articles stored in a storage container; and
   a replenishment determination unit configured to determine, based on the consumption information, whether to individually replenish articles in the storage container in which the articles have been consumed using a picking robot or to replace the storage container in which the articles have been consumed by a storage container in which a predetermined number of articles are stored.

2. The management apparatus according to claim 1, wherein the replenishment determination unit determines, based on the magnitude of the amount of consumption specified from the consumption information, whether to individually replenish the articles in the storage container in which the articles have been consumed using the picking robot or to replace the storage container in which the articles have been consumed by a storage container in which a predetermined number of articles are stored.

3. The management apparatus according to claim 1, wherein the replenishment determination unit determines, based on the magnitude of the variation of the amount of consumption for each kind of article specified from the consumption information, whether to individually replenish the articles in the storage container in which the articles have been consumed using the picking robot or to replace the storage container in which the articles have been consumed by a storage container in which a predetermined number of articles are stored.

4. The management apparatus according to claim 1, wherein the replenishment determination unit makes the determination based on a cost of the work performed by the picking robot calculated from features of the articles and the consumption information for replenishment by the picking robot.

5. The management apparatus according to claim 4, wherein the replenishment determination unit makes the determination based on the working cost which depends on at least a weight of the article.

6. The management apparatus according to claim 4, wherein the replenishment determination unit makes the determination based on the working cost which depends on at least a material of the article.

7. The management apparatus according to claim 4, wherein the replenishment determination unit makes the determination based on the working cost which depends on at least a shape of the article.

8. A management method, wherein
   a management apparatus acquires consumption information, which is information indicating an amount of consumption of articles stored in a storage container, and
   the management apparatus determines, based on the consumption information, whether to individually replenish articles in the storage container in which the articles have been consumed using a picking robot or to replace the storage container in which the articles have been consumed by a storage container in which a predetermined number of articles are stored.

9. A non-transitory computer readable medium storing a program for causing a computer to execute the following processing of:
   acquiring consumption information, which is information indicating an amount of consumption of articles stored in a storage container; and
   determining, based on the consumption information, whether to individually replenish articles in the storage container in which the articles have been consumed using a picking robot or to replace the storage container in which the articles have been consumed by a storage container in which a predetermined number of articles are stored.

* * * * *